US012748079B2

(12) United States Patent
Lopez Jauregui et al.

(10) Patent No.: US 12,748,079 B2
(45) Date of Patent: Sep. 29, 2026

(54) DEFECT SIZING COMBINING FIXED WAVELENGTH AND VARIABLE WAVELENGTH GUIDED WAVES

(71) Applicant: Innerspec Technologies, Inc., Forest, VA (US)

(72) Inventors: Borja Lopez Jauregui, Lynchburg, VA (US); Dileep Koodalil, Torrejon de Ardoz (ES); Alvaro Pallares, Torres de la Alameda (ES); Syed Ali, Lynchburg, VA (US)

(73) Assignee: Innerspec Technologies Inc., Forest, VA (US)

( * ) Notice: Subject to any disclaimer, the term of this patent is extended or adjusted under 35 U.S.C. 154(b) by 779 days.

(21) Appl. No.: 17/965,574

(22) Filed: Oct. 13, 2022

(65) Prior Publication Data

US 2024/0125742 A1 Apr. 18, 2024

(51) Int. Cl.

| | |
|---|---|
| ***G01N 29/24*** | (2006.01) |
| ***G01N 29/04*** | (2006.01) |
| ***G01N 29/07*** | (2006.01) |
| ***G01N 29/44*** | (2006.01) |
| ***G01N 29/46*** | (2006.01) |

(52) U.S. Cl.

CPC ....... *G01N 29/2412* (2013.01); *G01N 29/041* (2013.01); *G01N 29/043* (2013.01); *G01N 29/07* (2013.01); *G01N 29/4472* (2013.01); *G01N 29/46* (2013.01); *G01N 2291/0289* (2013.01); *G01N 2291/0422* (2013.01); *G01N 2291/0425* (2013.01); *G01N 2291/0427* (2013.01)

(58) Field of Classification Search

CPC ............ G01N 29/2412; G01N 29/041; G01N 29/043; G01N 29/07; G01N 29/4472; G01N 29/46; G01N 2291/0289; G01N 2291/0422; G01N 2291/0425; G01N 2291/0427

See application file for complete search history.

(56) References Cited

U.S. PATENT DOCUMENTS 8,553,494 B2 * 10/2013 Barolak ................. G01N 29/07 181/105

10,408,796 B2 * 9/2019 Bondurant .............. B06B 1/045

(Continued)

*Primary Examiner* — Francis C Gray

(57) ABSTRACT

A system and method for sizing defects in solid structures using guided waves. The system includes a magnetostrictive-strip EMAT transducer comprising at least one biasing static magnetic field, at least one RF coil for fixed-wavelength measurements, at least one RF coil for variable-wavelength measurements, and a strip of highly magnetostrictive material that is coupled with the structure. The fixed-wavelength RF coil permits obtaining measurements of amplitude and frequency content of signals reflected and/or attenuated when traveling through the structure which are used to estimate the size and geometry of any defects in this structure. The variable-wavelength RF coil permits recording the frequencies that are cut off or pass through the structure to also estimate the size of any defects in the structure. The fixed-wavelength sizing and geometry assessment is used to determine whether the variable-wavelength estimate is valid. The final assessment is based on the fixed-wavelength estimate, the variable-wavelength estimate, or a combination of both.

16 Claims, 6 Drawing Sheets

(56) References Cited

U.S. PATENT DOCUMENTS

| | | | | |
|---|---|---|---|---|
| 10,502,714 | B2 * | 12/2019 | Ren | G01N 29/2412 |
| 2021/0341432 | A1 * | 11/2021 | Ren | G01N 29/346 |
| 2022/0111417 | A1 * | 4/2022 | Lopez Jauregui | G01N 29/043 |
| 2022/0221429 | A1 * | 7/2022 | Popov | G01N 29/043 |

* cited by examiner

Smooth and Long Defects

Sharp and Short Defects

DEFECT SIZING COMBINING FIXED WAVELENGTH AND VARIABLE WAVELENGTH GUIDED WAVES

BACKGROUND

The present invention relates generally to the field of non-destructive testing and in particular to Electromagnetic Acoustic Transducer (EMAT).

Engineered structures exposed to tension, pressure, corrosive products, and harsh environments will eventually develop defects such as cracking and corrosion that could affect their structural integrity.

Ultrasonic guided waves are frequently used for the inspection of these structures since they permit covering long spans from a fixed point and inspecting areas that are hidden or not directly accessible. However, while finding defects has become common practice, characterization and sizing of these defects is a much more elusive goal.

The best-known guided wave sizing method with literature dating back to 1998 is the frequency cutoff technique. Recent work by Pialucha and Balasubramanian depicts two variations of this technique to assess the remaining wall of a plate or plate-like structure.

On U.S. Pat. No. 11,022,436 B2, Pialucha describes a system that uses a separate Shear Horizontal EMAT transmitter and receiver to generate the non-dispersive SH0 mode and at least one dispersive mode (e. g. SH1) at a wide range of frequencies. The remaining wall is derived from determining what frequencies propagate through the wall loss and which ones are "cut off" and reflected back by this wall loss. To be able to generate different frequencies, Pialucha uses a Lorentz force permanent magnet EMAT array transducer and a device that changes the wavelength of the transducer by mechanically moving the permanent magnets in the array to different wavelengths so the frequencies of interest can be generated.

On US20220214313A1, Balasubramanian describes a system that uses the same frequency cutoff technique for the same purpose. Balasubramanian in this case uses a transducer with variable wavelength which is excited with a broadband pulse (chirp, spike, or low cycle Hanning) to generate the desired wave modes. Balasubramanian also uses a Lorentz force EMAT magnet array transducer in his description and drawings, but in this case, there is no need for a mechanical device to discretely change the wavelength of the EMAT transducer.

The constructions described by both Pialucha and Balasubramanian rely on Lorentz force EMAT magnet arrays which have some limitations.

One limitation of this construction is that it can only be used on conductive materials since it relies on electromagnetic induction of the ultrasound on the material.

Another limitation of this transducer construction is that the maximum size of each pole in the array is equivalent to half of the smallest wavelength that needs to be generated, so the individual magnets tend to be relatively small and therefore weak. Moreover, by having the magnets in the array with different polarity next to each other, a large component of the magnetic field flows from pole to pole instead of to the part underneath. The result is that Lorentz force EMAT magnet array transducers are limited to larger wavelengths and generate very weak signals which makes them ineffective for most amplitude-based analyses.

Another limitation of this transducer construction is that the transmitter also generates ultrasound in the permanent magnets which create strong reverberations that can hide the receiving signals. The solution is to use different transducers from transmission and reception which increases the footprint of the design and reduces the practicality of the system.

Balasubramanian mentions using EMATs based on magnetostriction, but magnetostrictive EMATs by themselves are further limited to ferromagnetic materials and require extremely strong tangential fields that can only be produced with pulsed electromagnets or very large permanent magnets that make them unwieldy and difficult to use.

In addition to the limitations of the transducer constructions described by Pialucha and Balasubramanian, the more fundamental problem is the shortcomings inherent to the frequency cutoff technique itself.

Mathematical modeling has shown that the shape of the defects with regard to depth, length, and angle in the wave propagation direction has a great effect on how they perform as frequency filters. For example, short and sharp defects can result in mode conversion of the SH1 mode as it goes through the defects thus creating new frequency components that render the technique moot. Similarly, the non-dispersive SH0 mode can also have frequency components above the cutoff frequency which, depending on the depth, length, and angle of the defects, can mode-convert to SH1 also causing the technique to provide wrong results. These problems are especially acute on short but deep defects such as pits and cracks which can be especially damaging to a structure but cannot be reliably measured using the frequency cutoff technique.

In addition to the depth, length, and angle of the defects in the direction of wave propagation, the width of the defects can also make the technique fail. In this case, if the aperture of the RF coil and beam profile is wider than the defects, the wave can wrap around them and propagate to the other side instead of being cut off.

Another limitation of this technique is that the transmitter and receiver transducers need to be sufficiently far apart to differentiate the measurements of the SH0 and SH1 wave modes. This limitation impedes using this technique for many close-range applications such as circumferential measurements on pipes and tubes smaller than 150-200 mm in diameter.

This disclosure introduces a novel guided wave system and method that circumvents these limitations with a combination of fixed-wavelength and variable-wavelength analysis as well as a novel magnetostrictive-strip EMAT transducer that permits signal amplitude measurements by greatly increasing signal-to-noise.

The system and method can be applied to any structure that supports the propagation of guided waves, regardless of the material and geometry.

SUMMARY OF THE INVENTION

A first aspect of the present invention provides a system with a magnetostrictive-strip EMAT transducer comprising at least one biasing static magnetic field, at least one RF coil for fixed-wavelength measurements, at least one RF coil for variable-wavelength measurements, and a strip of highly magnetostrictive material that is coupled with the structure.

A second aspect of the present invention provides a method to determine the size of defects on a relatively thin structure such as a pipeline wall, a tank wall, a rod, or a plane fuselage component by combining fixed-wavelength measurements of the signal reflected or attenuated by the defects with a variable-wavelength frequency analysis to detect and determine the actual frequencies that have propagated through the area being inspected.

The method involves pulsing the RF coil for fixed-wavelength measurements and recording the strength of the reflected and/or attenuated signal after it passes through the area of interest, as well as the frequency content of this response. A second measurement is performed by pulsing a variable-wavelength RF coil to record the frequencies that are reflected or pass through the area being inspected. The fixed-wavelength results are processed using artificial intelligence algorithms (e.g. neural network) that include models created using Finite Element Analysis and empirical calibrations. These fixed-wavelength measurements provide defect geometry and size estimates that are used to determine whether the variable-wavelength depth measurements can also be used. The accuracy of the system can be further improved by taking measurements from different locations. The final defect sizing assessment is based on the fixed-wavelength estimate, the variable-wavelength estimate, or a combination of both.

DETAILED DESCRIPTION OF THE INVENTION

Figure 1A:
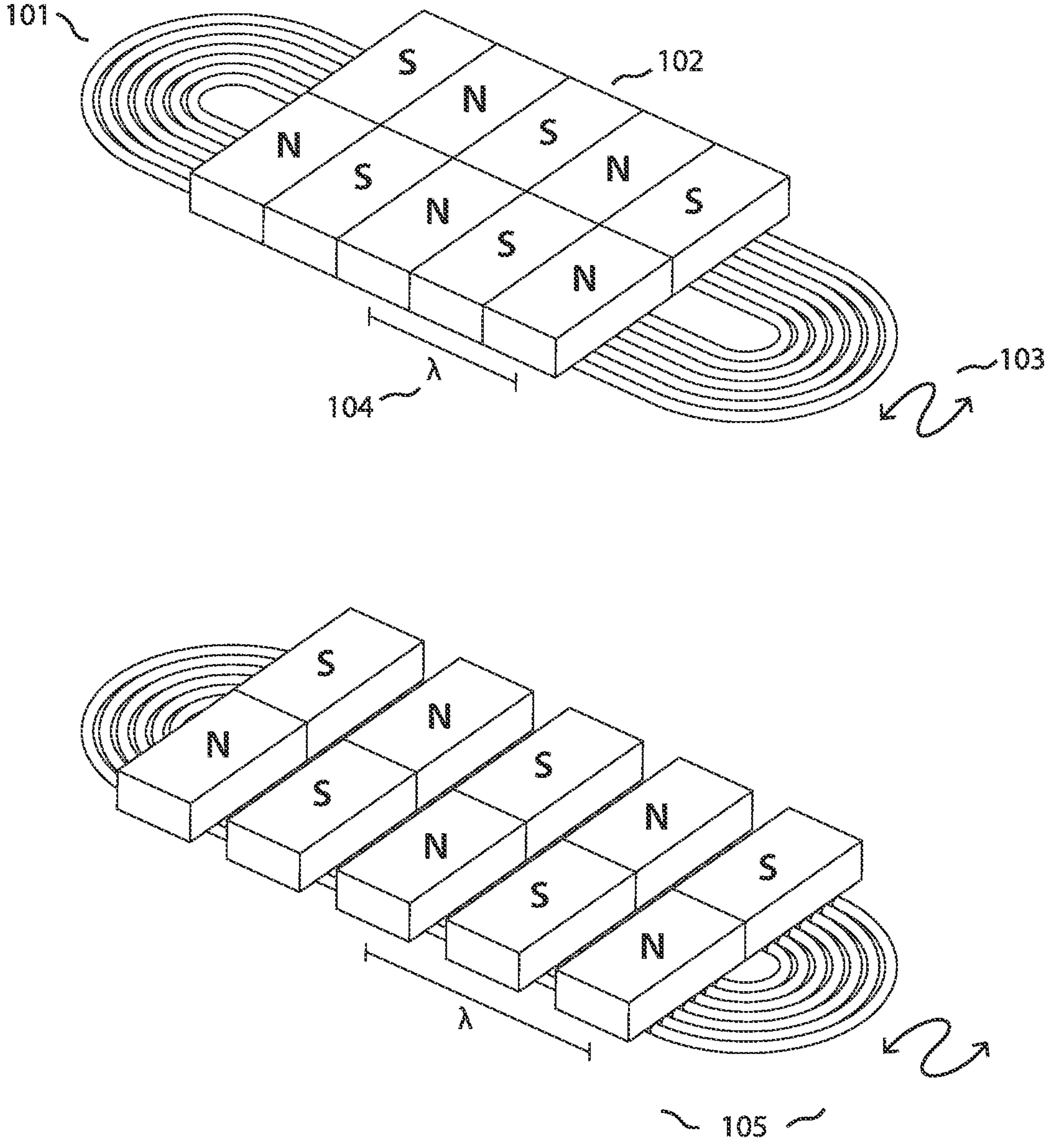
Fig. 1A Prior Art
FIG. 1A shows a Lorentz force EMAT magnet array used in prior art. The wavelength of the sensor is changed by moving away the magnets in the array.

The following detailed description is of the best currently contemplated modes of carrying out exemplary embodiments of the invention. The description is not to be taken in a limiting sense but is made merely to illustrate the general principles of the invention since the scope of the invention is best defined by the appended claims.

This invention describes a novel system that can be used to estimate the defect size of any structure that supports the transmission of guided waves in frequencies ranging from 20 kHz to 10 MHz which is the practical range used for inspection with ultrasonic guided waves. The system can be applied to plates, pipes, rods, wire ropes, and other structures made out of metallic and non-metallic materials.

The method used in this system combines a fixed-wavelength analysis of amplitude and frequency response with a variable-wavelength cutoff frequency technique to further refine the analysis when the dimensions and geometry of the defects permit this analysis.

The system uses a magnetostrictive-strip EMAT transducer which has shown to produce up to 40 dB stronger signals than equivalent Lorentz force EMAT magnet array transducers and 20-30 dB stronger signals than magnetostrictive EMAT transducers. The strong signal-to-noise is paramount for detecting and sizing cracks and pits of small diameter using amplitude measurements as part of the fixed-wavelength analysis since they cannot be properly detected and sized using the cutoff frequency technique.

A magnetostrictive EMAT transducer induces ultrasonic waves into a test object with two interacting magnetic fields. A relatively high frequency (RF) field is generated by electrical coils and a strong biasing tangential field is generated with large permanent magnets or a pulsed electromagnet. The tangential magnetic field is perpendicular to the direction of wave propagation to generate shear-horizontal type waves or parallel to the direction of wave propagation to generate Lamb waves, shear vertical waves, and surface waves. These transducers work only on naturally magnetostrictive materials which limits them in practice to mild grades of low-carbon steel.

A magnetostrictive-strip EMAT transducer on the other hand can be used to inspect materials with low or no magnetostriction or to simply improve signal-to-noise on any material. In this case, the ultrasound is induced on a strip of highly magnetostrictive material such as FeCo which is pressure-coupled or adhered to the structure. The RF coil or coils are positioned on top of this strip and the biasing magnetization may be achieved by swiping the magnetostrictive strip with a permanent magnet before the scan, or by using a weak permanent magnet or an electromagnet. Unlike a Lorentz force EMAT magnet array or an EMAT that relies on the magnetostriction of the structure, the magnetostrictive-strip EMAT transducer can be used on any component that can support the propagation of guided waves, regardless of the material composition of the component. Unlike Lorentz force EMAT magnetic array transducers, the magnetostrictive strip transducers can be used to transmit and receive with the same transducer.

The transducer includes a position encoder, such as a rotary or linear encoder, which tracks the location of the transducer as it moves over the surface of the structure to enable spatial correlation of received signals.

The RF coils include both fixed-wavelength coils, designed with evenly spaced meanders and excited using single-frequency tone bursts, and variable-wavelength coils, which incorporate meanders of variable spacing and are excited with a series of single-frequency tone bursts or broadband pulses such as chirps or low-cycle Hanning tone bursts.

A biasing magnetization is applied by means of a permanent magnet or pulsed electromagnet to align magnetic domains in the magnetostrictive strip. This field may be oriented perpendicularly to the direction of wave propagation to generate shear-horizontal waves, or parallel to generate Lamb or shear vertical modes.

The system supports both pulse-echo configurations (same transducer transmits and receives) and pitch-catch configurations (separate transmit and receive transducers).

Some coil designs include curvature, enabling the waves to be focused at specific target points inside the structure.

Adjustments such as coil aperture, focusing, and distance amplitude correction (DAC) can be applied in modeling.

A pulser-receiver instrument is connected to the RF coils and is operated via a computer that also processes data. The computer includes a memory for storing FEM-based models and empirical data, and applies a set of algorithms:

A multi-factorial analysis algorithm processes fixed-wavelength amplitude and frequency data to estimate defect dimensions.

A second algorithm analyzes frequency content from variable-wavelength data to estimate defect depth using cutoff frequency.

A third validation algorithm determines if the depth result aligns with the dimension estimate.

A fourth algorithm integrates the two results for a final size estimate.

Measurements may be taken from multiple positions and orientations to improve accuracy. Algorithms use regression analysis, neural networks, or AI techniques and may process data using FFT or STFT.

The novel magnetostrictive-strip EMAT transducer in this disclosure incorporates at least two RF coils; a narrowband fixed-wavelength meander RF coil, and a broadband variable-wavelength coil used for frequency cutoff discrimination. Additional fixed-wavelength and variable-wavelength coils can be added to address different thicknesses at the same time.

FIG. 1A shows a representation of a Lorentz force EMAT magnetic array transducer used in prior art. A "racetrack" style RF coil 101 is looped under a magnet array with magnets of alternating polarity 102. The RF coil is excited with alternating current inducing eddy currents on the surface of an adjacent metallic material. The static magnetic field of the magnet array creates normal fields that interact with the eddy currents and generate the Shear Horizontal wave energy in the material along the magnet array 103. The wavelength in this construction is equal to the distance from center to center of adjacent two poles of the same polarity 104. The wavelength can be changed by moving the poles of the array in the direction of wave propagation 105. The proximity and size of the poles make these transducers especially inefficient and poorly suited for any amplitude-based analysis.

Figure 1B:
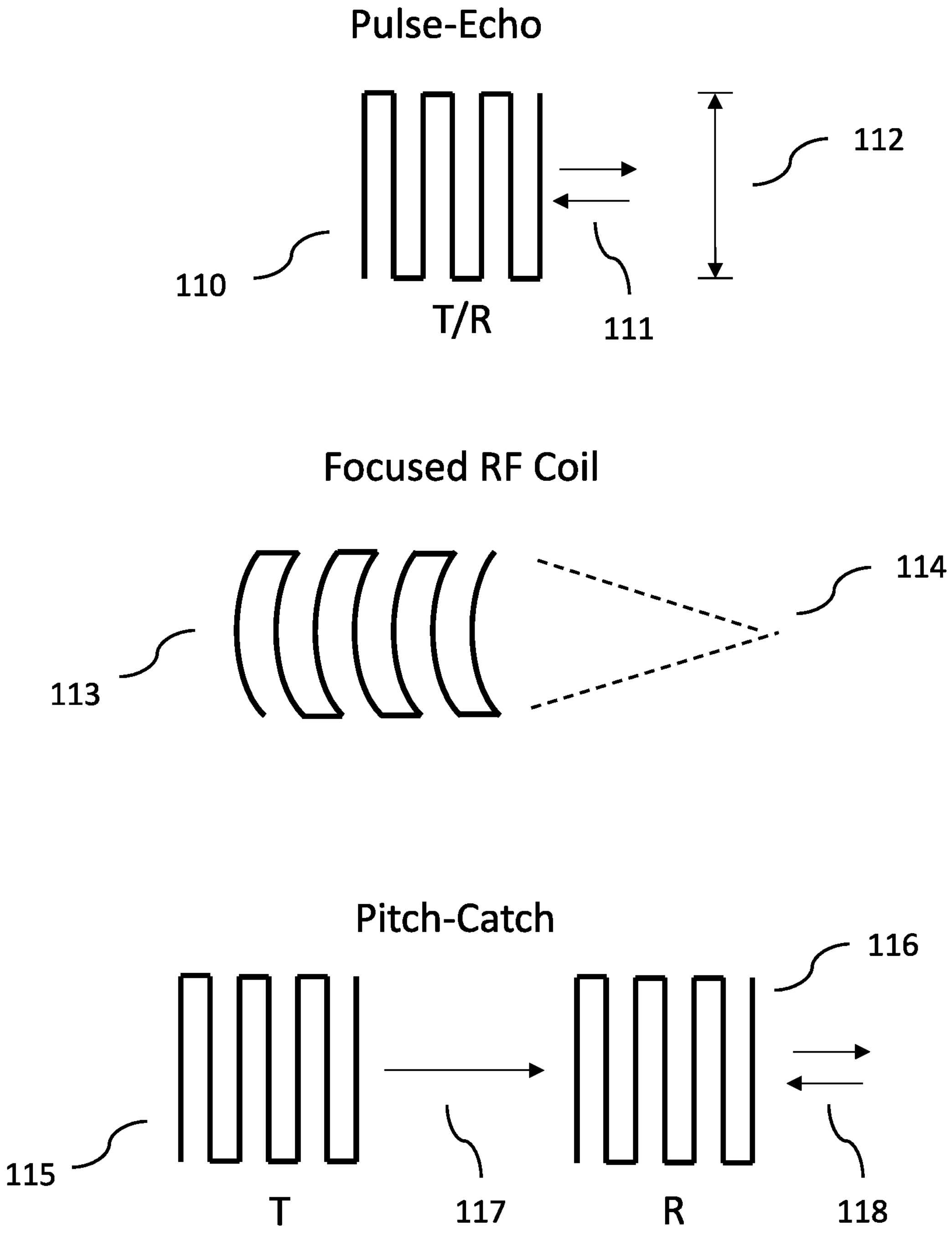
Fig. 1B Prior Art
FIG. 1B shows standard EMAT RF coil configurations such as Pulse-Echo and Pitch-Catch, and an example of a focused RF coil used in Prior Art.

FIG. 1B shows a representation of a standard Pulse-Echo EMAT RF coil configuration, with and without focusing, and a standard Pitch-Catch EMAT RF coil configuration used in Prior Art. In Pulse-Echo the single EMAT RF coil 110 acts both as Transmitter and Receiver and sends and receives ultrasound 111 with the same RF coil. The Coil Aperture 112 is determined by the physical width or opening of the EMAT coil in the direction perpendicular to wave propagation. The RF coil can also be designed with a fixed curvature 113 so as to physically focus the ultrasonic energy at a given point 114. In Pitch-Catch configuration, the Transmitter RF coil 115 is separate from the Receiver RF coil 116. The Receiver shown in this representation can receive signals coming directly from the Transmitter 117, or reflections coming back to the Receiver after it passes under the Receiver 118.

Figure 2:
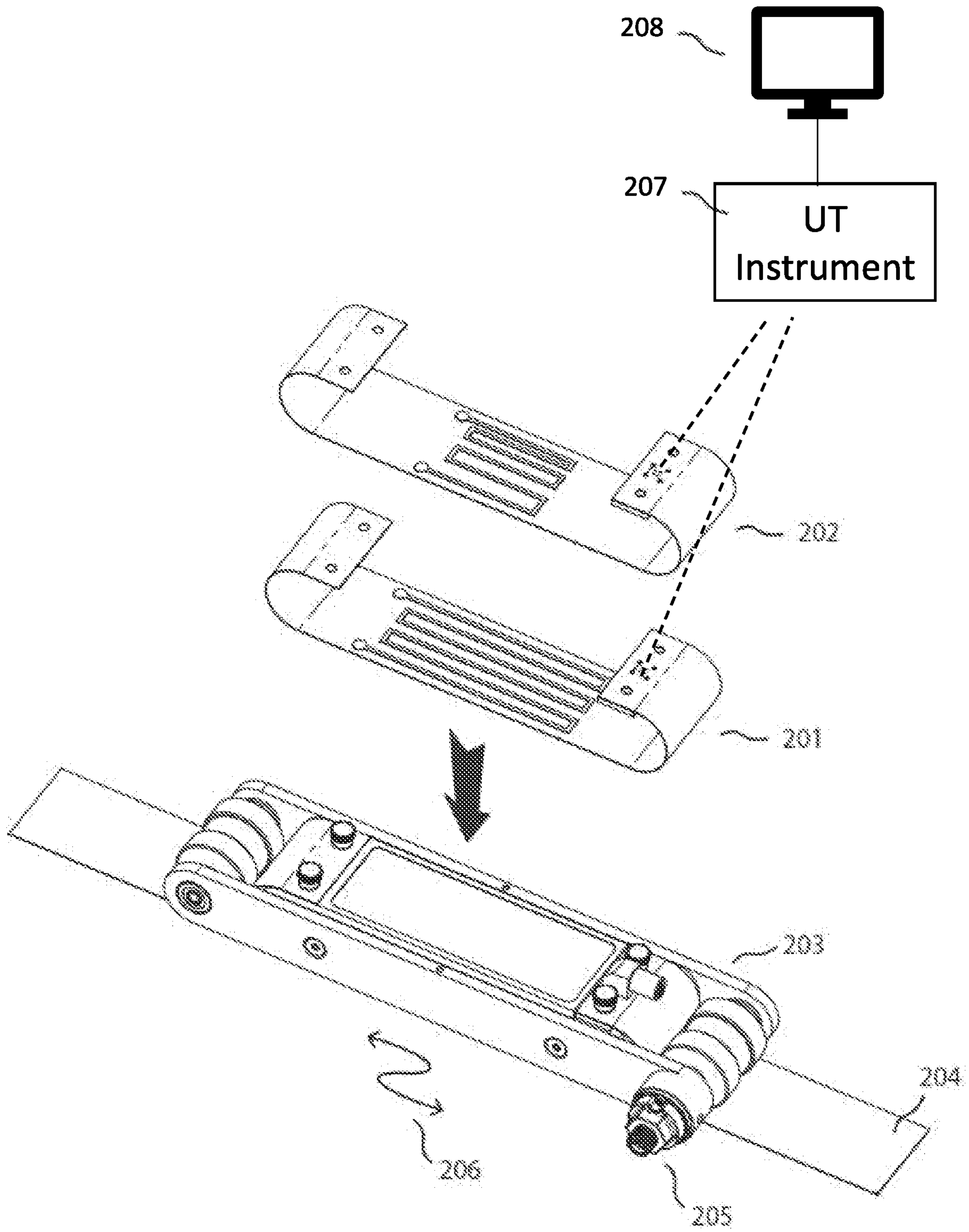
FIG. 2 shows an embodiment of a magnetostrictive EMAT transducer used on this disclosure connected to an Ultrasonic Testing (UT) instrument and a computer. The transducer includes two RF coils for fixed-wavelength and variable-wavelength measurements. The ultrasound is generated on a magnetostrictive strip that is coupled to the component.

FIG. 2 shows an embodiment of the novel magnetostrictive-strip transducer capable of generating SH and Lamb waves using fixed-wavelength and variable-wavelength RF coils. A fixed-wavelength meander RF coil 201 and a broadband variable-wavelength RF coil 202 are mounted and connected to the transducer 203. The transducer moves on top of a magnetostrictive strip 204 that has been adhered to the component inspected. A biasing magnetization is applied by means of swiping the strip with a magnet to align magnetic domains in the magnetostrictive strip prior to the inspection. The transducer includes a built-in encoder 205 to be able to provide precise positioning along the component. In this configuration, the transducer generates SH waves that travel perpendicularly to the meanders of the RF coils and the long axis of the strip 206. The RF coils are connected to an Ultrasonic Testing (UT) instrument 207 that pulses and receives the signals from the RF coils, and is operated by a computer 208 that also processes the acquired data.

Even though the transducer can have both RF coils mounted and pulsed together, they can also be positioned on separate transducers and pulsed together or separately in Pitch-Catch configuration.

Figure 3:
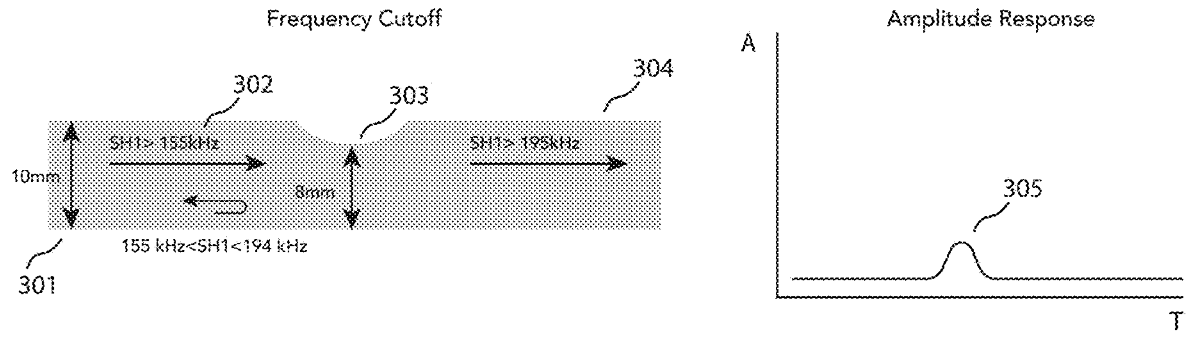
FIG. 3 shows the effect of frequency cutoff on a long and smooth defect vs a short and sharp defect of the same depth. The long and smooth defect provides good frequency cutoff but low amplitude response. The short and sharp defect does not provide a proper frequency cutoff but can provide a measurable amplitude response that can be used for determining the geometry of the defect.
Figure 3:
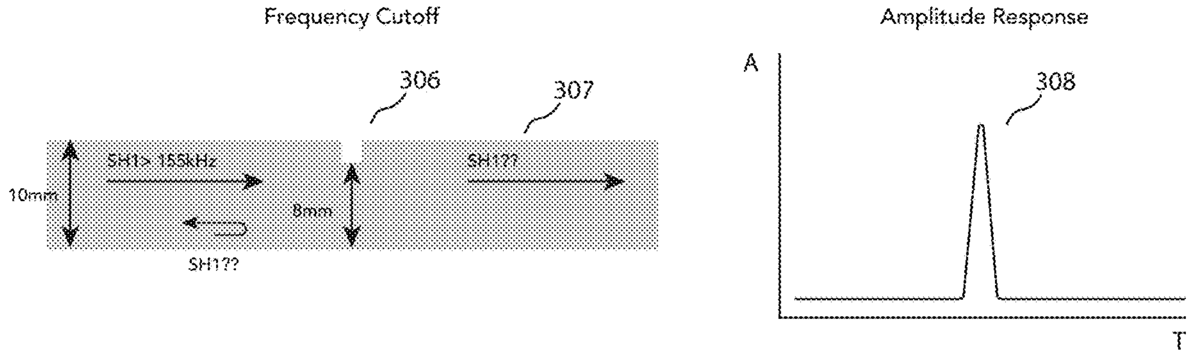

FIG. 3 shows how the shape of a defect affects the variable-wavelength frequency cutoff technique and how it can be complemented with amplitude or frequency response measurements using a standard fixed-wavelength measurement. A plate 10 mm thick 301 will sustain any SH1 frequency above 155 kHz 302. A long and smooth defect 303 penetrating 20% into the plate will effectively cut off frequencies smaller than 194 kHz 304. However, since the defect is smooth and gradual, it will provide very low or no amplitude response 305. On the other hand, if a defect of the same depth is sharp and short 306, mode conversion will prevent effective frequency cutoff and it is not be possible to know the frequencies that are reflected or pass through the defect 307. However, this defect would provide a measurable amplitude response 308 using a fixed-frequency RF coil that can be used for dimensioning and further analysis.

The fixed-wavelength RF coil can collect signal reflections and attenuation as well as the frequency content of these signals. This information can be received from one or more locations on the structure to further improve accuracy.

Figure 4:
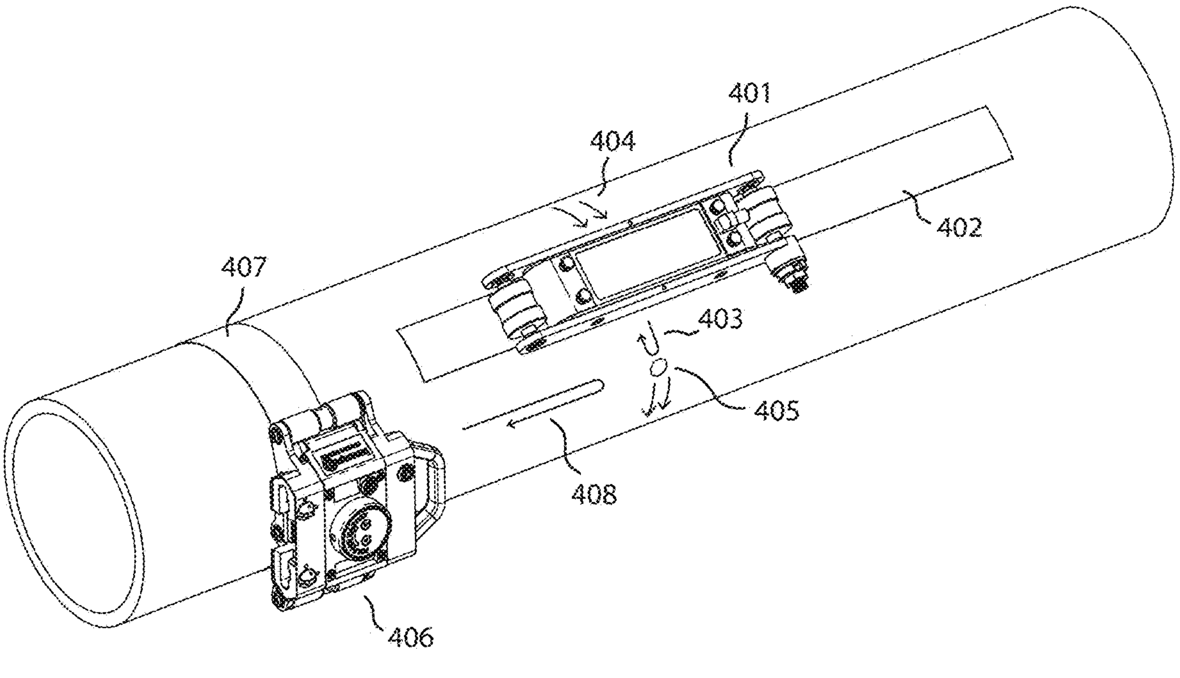
FIG. 4 shows the fixed-wavelength analysis applied from different scanning locations to provide information on the geometry of the defects. In this case, the component is a pipe that is being scanned axially and circumferentially.

FIG. 4 shows a magnetostrictive-strip EMAT transducer scanning axially 401 on top of a strip adhered to the side of a pipe 402. The transducer sends guided waves circumferentially and measures signal reflections 403 and the attenuation from the wrap-around signal around the pipe 404 which is affected by defects in their path 405. Another magnetostrictive-strip EMAT transducer 406 moving over a strip adhered around the circumference of the pipe 407 can scan the area of interest with guided waves that propagate axially on the pipe 408 collecting additional information on the position, dimensions, and amplitude of the same defects from a different location.

Figure 5:
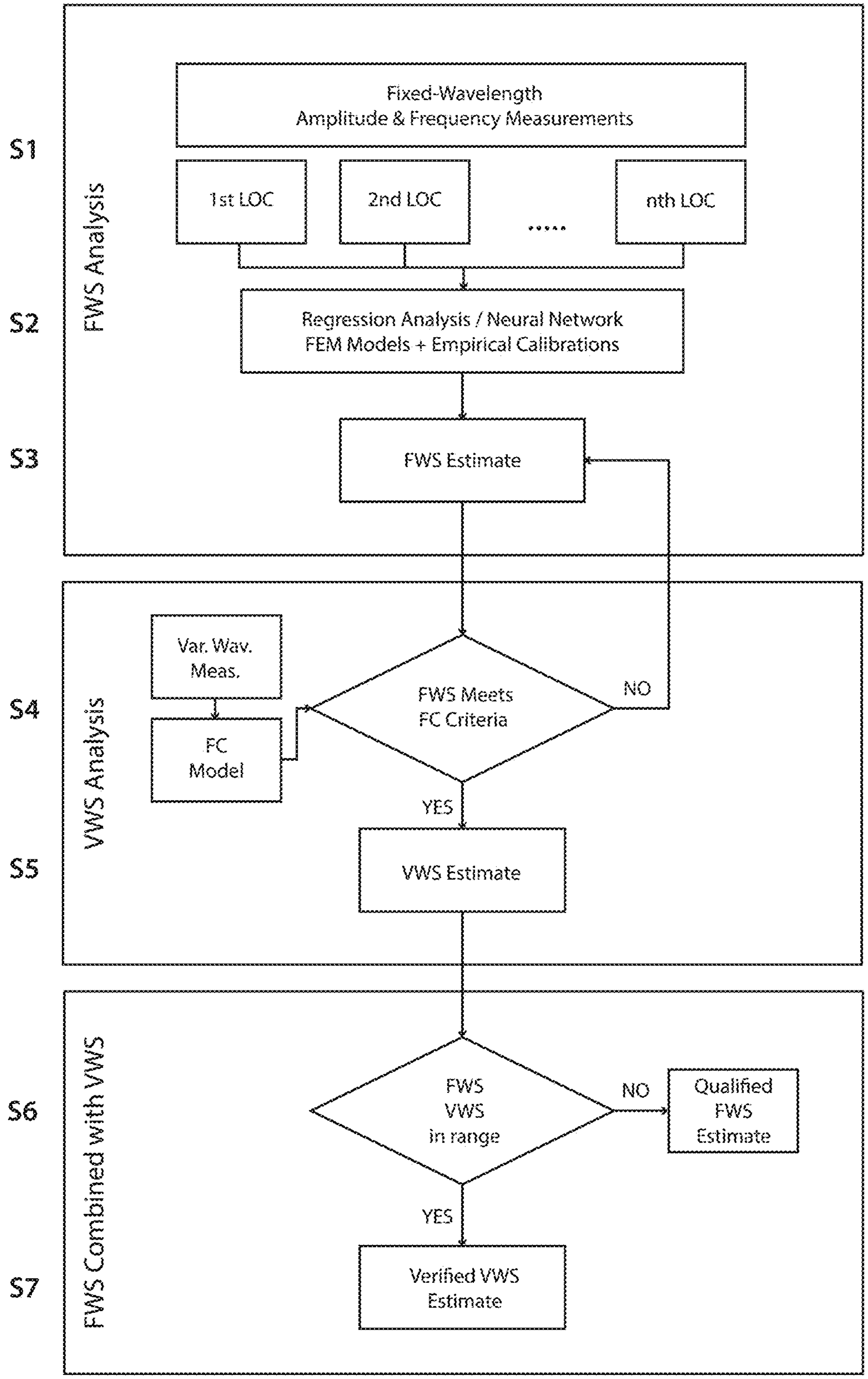
FIG. 5 shows the detailed steps used to deploy the combined guided-wave technique using both Fixed-Wavelength Sizing (FWS) and Variable-Wavelength Sizing (VWS).

The complete methodology for the fixed-wavelength and variable-wavelength technique is shown in FIG. 5 and includes the following steps.

In Step S1 the values of amplitude and frequency content from the fixed-wavelength RF coil from one or more locations are measured and registered. The values can include amplitude from reflection and/or attenuation. The frequency content can be calculated using a Fast-Fourier Transform (FFT) or Short-Time Fourier Transform (STFT) on the received signals.

In S2 the results are processed through regression analysis and a neural network or similar artificial intelligence algorithm that includes models of the structure using Finite Element Modeling and Empirical Calibrations from representative samples. As more samples and actual results are entered into the model, the system will improve its accuracy over time.

The results from the Amplitude and Frequency Content analysis is a Fixed-Wavelength Sizing (FWS) Estimate of the structure with information on the dimensions of the defects S3.

In parallel, the system takes readings with the variable-wavelength RF coil which is inserted in the Frequency Cutoff Model (FC Model). If the FWS Estimate for size and dimensions does not meet the requirements to use the FC Model, the final result is the FWS Estimate previously calculated S4.

If the FWS meets the FC Model criteria, the system uses the data collected from the variable-wavelength RF coil and generates a Variable-Wavelength Sizing (VWS) Estimate S5.

The results from FWS and VWS are compared. If they are not in the expected range, the system provides a Qualified FWS Estimate with a narrower range and higher confidence than the simple FWS Estimate S6.

If the results from FWS and VWS are in range, the system provides a verified VWS Estimate with the highest degree of confidence and accuracy range S7.

What is claimed is:

1. A system for sizing defects on a solid structure using guided waves, comprising:

A magnetostrictive transducer body fitted with a position encoder designed to mount at least two Electro Magnetic Acoustic Transducer (EMAT) Radio Frequency (RF) coils;

At least one fixed-wavelength EMAT RF coil with meanders evenly spaced apart designed to be pulsed with a single frequency tone burst;

At least one variable-wavelength EMAT RF coil with meanders of variable spacing designed to be pulsed with a variable frequency tone burst;

At least one magnet for applying a biasing magnetization to the magnetostrictive strip coupled to the structure;

A pulser-receiver instrument electronically connected to the RF coils, configured to transmit and receive ultrasonic signals using fixed-frequency and variable-frequency waveforms;

A computer comprising a memory for storing signal data and models calculated using empirical calibrations and Finite Element Models (FEM), and a processor programmed to apply algorithms to compare received signals to modeled responses and estimate defect dimensions.

2. The system of claim 1, wherein the biasing magnetic field is perpendicular to the direction of wave propagation to generate shear-horizontal waves.

3. The system of claim 1, wherein the biasing magnetic field is parallel to the direction of wave propagation to generate Lamb waves.

4. The system of claim 1, wherein the same transducer is used to transmit and receive the signals in a pulse-echo configuration.

5. The system of claim 1, wherein a different transducer is used to transmit and receive the signals in a pitch-catch configuration.

6. The system of claim 1, wherein the fixed-wavelength EMAT RF coil has a curvature to focus at a specific point in the structure.

7. The system of claim 1, wherein the variable-wavelength EMAT RF coil has a curvature to focus at a specific point in the structure.

8. The system of claim 1, wherein the magnetostrictive strip is coupled with the structure using glue, adhesive tape, or pressure.

9. The system of claim 1, wherein the magnetostrictive strip has been replaced with a magnetostrictive coating that is permanently bonded into the structure using cold-spray, flame-spray, or a similar permanent bonding process.

10. A method for sizing defects on a solid structure using guided waves, comprising:

Performing amplitude and frequency content measurements of guided wave signals using at least one fixed-wavelength RF coil excited by a single-frequency tone burst;

Processing the signal data from the fixed-wavelength RF coil using a multi-factorial algorithm based on stored models to estimate the dimensions of detected defects;

Performing a cutoff frequency analysis using at least one variable-wavelength RF coil excited with a multi-frequency tone burst;

Analyzing the reflected or transmitted frequency content from the variable-wavelength excitation to calculate the cutoff frequency and estimate defect depth based on the frequencies that are reflected back or pass through the structure;

Applying a validation algorithm to determine if the depth estimate calculated with cutoff frequency is consistent with the fixed-wavelength amplitude estimates;

Producing a final estimate of defect size based on the combination or selection of fixed-wavelength and variable-wavelength analyses.

11. The system of claim 10, wherein the fixed-wavelength and variable-wavelength RF coils are pulsed at frequencies ranging from 20 kHz to 10 MHz.

12. The system of claim 10, wherein the multi-factorial analysis is performed by regression analysis, a neural network algorithm or another artificial intelligence algorithm.

13. The system of claim 10, wherein the frequency analysis is performed using a Fast-Fourier Transform or a Short-Time Fourier Transform.

14. The system of claim 10, wherein the models stored in memory have been calculated using Finite Element Modeling of the structure and empirical calibrations using representative samples with artificial and/or natural defects.

15. The system of claim 10, wherein different measurements are taken from different points in the structure to address the area of interest from different angles and improve the accuracy of the dimensioning algorithms.

16. The system of claim 14, wherein the models include adjustments for coil aperture, coil focusing, and Distance Amplitude Correction (DAC).

* * * * *